US010763937B2

(12) United States Patent
Kusano et al.

(10) Patent No.: US 10,763,937 B2
(45) Date of Patent: Sep. 1, 2020

(54) BASE STATION, MOBILE STATION, AND COMMUNICATION METHOD

(71) Applicant: MITSUBISHI ELECTRIC CORPORATION, Tokyo (JP)

(72) Inventors: Masaaki Kusano, Tokyo (JP); Noriyuki Fukui, Tokyo (JP); Keijiro Take, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/349,206

(22) PCT Filed: Jan. 23, 2017

(86) PCT No.: PCT/JP2017/002104
§ 371 (c)(1),
(2) Date: May 10, 2019

(87) PCT Pub. No.: WO2018/134995
PCT Pub. Date: Jul. 26, 2018

(65) Prior Publication Data
US 2019/0334604 A1    Oct. 31, 2019

(51) Int. Cl.
*H04B 7/06* (2006.01)
*H04B 7/0426* (2017.01)
(Continued)

(52) U.S. Cl.
CPC .......... *H04B 7/0639* (2013.01); *H04B 7/043* (2013.01); *H04B 7/10* (2013.01); *H04L 27/2607* (2013.01);
(Continued)

(58) Field of Classification Search
CPC ........ H04B 7/0639; H04B 7/043; H04B 7/10; H04L 27/2607; H04L 27/2692; H04W 16/28
See application file for complete search history.

(56) References Cited

U.S. PATENT DOCUMENTS

| | | | |
|---|---|---|---|
| 9,769,830 B2 * | 9/2017 | Yang | H04W 88/00 |
| 2009/0252140 A1 * | 10/2009 | Imaeda | H04B 7/0617 370/342 |

(Continued)

FOREIGN PATENT DOCUMENTS

JP    2015-185914 A    10/2015

OTHER PUBLICATIONS

"WF on RACH Procedure for Multi-beam Operation", 3GPP TSG RAN WG1 Meeting #86bis, R1-1610489, Oct. 10, 2016, total of 5 pages.

(Continued)

*Primary Examiner* — Freshteh N Aghdam
(74) *Attorney, Agent, or Firm* — Birch, Stewart, Kolasch & Birch, LLP

(57) ABSTRACT

A base station that communicates with a mobile station that intermittently performs a receiving operation during a cyclic reception period includes: an assignor that assigns a preamble to the mobile station; a start request signal generator that generates a start request signal containing the preamble assigned to the mobile station and requesting the start of a synchronization process between the mobile station and the base station; and a beam controller that transmits start request signals in a plurality of directions within the reception period while switching directions of directional beams for transmitting start request signals, and determines the direction of the directional beam for communicating with the mobile station, in accordance with the direction of the directional beam at the time of reception of the preamble (Continued)

transmitted from the mobile station having received the start request signal.

13 Claims, 12 Drawing Sheets

(51) Int. Cl.
*H04B 7/10* (2017.01)
*H04L 27/26* (2006.01)
*H04W 16/28* (2009.01)

(52) U.S. Cl.
CPC ......... *H04L 27/2692* (2013.01); *H04W 16/28* (2013.01)

(56) References Cited

U.S. PATENT DOCUMENTS

2014/0003369 A1* 1/2014 Josiam .............. H04W 72/0406
370/329
2016/0242159 A1* 8/2016 Ho ...................... H04B 7/0408
2017/0111850 A1 4/2017 Okasaka et al.

OTHER PUBLICATIONS

CMCC, "Beam Sweeping using multi-width beams", 3GPP TSG RAN WG1 NR Ad-Hoc Meeting, R1-1701069, Jan. 20, 2017, total of 6 pages.

Notification of reasons for refusal issued in the corresponding JP Application No. 2018-562846 dated Apr. 23, 2019.

Samsung, "Discussion on SS block/bust/burst set for the multi-beam case", 3GPP TSG RAN WG1 Meeting #87, R1-1612450, Nov. 18, 2016, total of 3 pages.

C. Nicolas Barati et al., "Initial Access in Millimeter Wave Cellular Systems", IEEE Transactions on Wireless Communication, vol. 15, No. 12, Dec. 2016, pp. 7926-7940.

Office Action issued in corresponding German Application No. 112017006378.7 dated Mar. 26, 2020.

* cited by examiner

| DL BEAM SWEEP NUMBER | #1 | #2 | ... | #N |
|---|---|---|---|---|
| BEAM DIRECTION | 2a 2d 2x | 2b 2e 2y | ... | 2c 2f 2z |

IDENTICAL BEAM DIRECTIONS

| DL BEAM SWEEP NUMBER | #1 | #2 | ... | #N |
|---|---|---|---|---|
| BEAM DIRECTION | 2a 2d 2x | 2b 2e 2y | ... | 2c 2f 2z |

BASE STATION, MOBILE STATION, AND COMMUNICATION METHOD

FIELD

The present invention relates to a base station, a mobile station, and a communication method for performing communication using directional beams.

BACKGROUND

In a fifth-generation mobile communication system, the frequency band to be used becomes wider, and therefore, radio waves in a high-frequency band, called millimeter waves, are expected to be used. The radio waves in a high-frequency band tend to attenuate. To counter this, there are suggested methods for improving communication quality between a base station and a mobile station by forming a high-gain directional beam using a directional antenna and compensate for the attenuation of radio waves. In such a system, the range in which communication can be performed with one directional beam is narrow, and therefore, communication is performed with a directional beam directed toward a mobile station. Hereinafter, a range in which communication can be performed with one directional beam will be referred to as a spot.

However, in a situation where a base station cannot identify the position of a mobile station, the base station cannot identify the direction in which a directional beam is to be directed. To counter this, a method called a beam sweep is used. By this method, a radio signal is transmitted in a plurality of directions while directions of directional beams are switched. The base station determines the direction of the directional beam so that a plurality of spots covers the entire area of the cell that is the communication area of the base station.

Patent Literature 1 discloses a mobile communication system that performs a beam sweep using a directional beam when a mobile station establishes the initial connection to a base station. The base station cyclically repeats transmitting a known synchronization signal and an annunciation signal containing information for connecting to the base station, and the mobile station detects the presence of the base station using the synchronization signal. Using the information contained in the received annunciation signal, the mobile station transmits a preamble to the detected base station, and starts a contention synchronization process. In order for the base station to receive the preamble transmitted from the mobile station using a directional beam, it is necessary to direct the directional beam in the direction in which the mobile station is located at the timing when the preamble reaches the base station. Therefore, in the system disclosed in Patent Literature 1, the mobile station is notified of the timing to direct a directional beam in the direction of the mobile station, through a synchronization signal or an annunciation signal. As the preamble is transmitted to the base station at the timing of which the mobile station is notified, it becomes possible for the base station to more certainly receive the preamble, and it is possible to shorten the time required until synchronization is established.

A situation where a base station cannot identify the position of a mobile station may occur not only during initial connection but also in a mobile station performing discontinuous reception (DRX) control. DRX control is a control method suggested for reducing power consumption by a mobile station in a mobile communication system such as Long Term Evolution (LTE), and the mobile station performs a receiving operation only for a short time during a cyclic reception period. If the mobile station moves and changes the distance to the base station after the base station has established the initial connection to the mobile station, the base station and the mobile station might fall out of synchronization. If data to be transmitted from the base station to the mobile station is generated in this situation, a synchronization process such as random access is performed to achieve synchronization. At this time, if the base station receives a signal from the mobile station, the base station can identify the direction of the mobile station. However, the timing of signal transmission from a mobile station performing DRX control is irregular, and therefore, the base station cannot identify the direction of the mobile station that is performing DRX control. In view of this, the base station might perform a synchronization process using a beam sweep.

CITATION LIST

Patent Literature

Patent Literature 1: Japanese Patent Application Laid-Open No. 2015-185914

SUMMARY

Technical Problem

In this case, however, the mobile station does not know that a synchronization process is necessary. In a case where downlink data addressed to the mobile station is generated from the base station in an out-of-synchronization state, it is necessary to perform a non-contention synchronization process in which the base station requests the mobile station to start a synchronization process.

The present invention: has been made in view of the above circumstances; and aims to obtain a base station that uses a directional beam and capable of requesting a mobile station that is performing DRX control to start a non-contention synchronization process.

Solution to Problem

To solve the above problem and achieve the object, the present invention provides a base station that communicates with a mobile station that is performing DRX control, and includes: an assignor that assigns a preamble to the mobile station; a start request signal generator that generates a start request signal containing the preamble assigned to the mobile station and requesting the start of a synchronization process between the mobile station and the base station; and a beam controller that transmits start request signals in a plurality of directions within the reception period while switching directions of directional beams for transmitting start request signals, and determines the direction of the directional beam for communicating with the mobile station, in accordance with the direction of the directional beam at the time of reception of the preamble transmitted from the mobile station having received the start request signal.

Advantageous Effects of Invention

A base station that uses a directional beam according to the present invention is capable of requesting a mobile station performing DRX control to start a non-contention synchronization process.

DESCRIPTION OF EMBODIMENTS

The following is a detailed description of base stations, mobile stations, and communication methods according to embodiments of the present invention, with reference to the drawings. It should be noted that these embodiments do not limit the present invention.

First Embodiment

Figure 1:
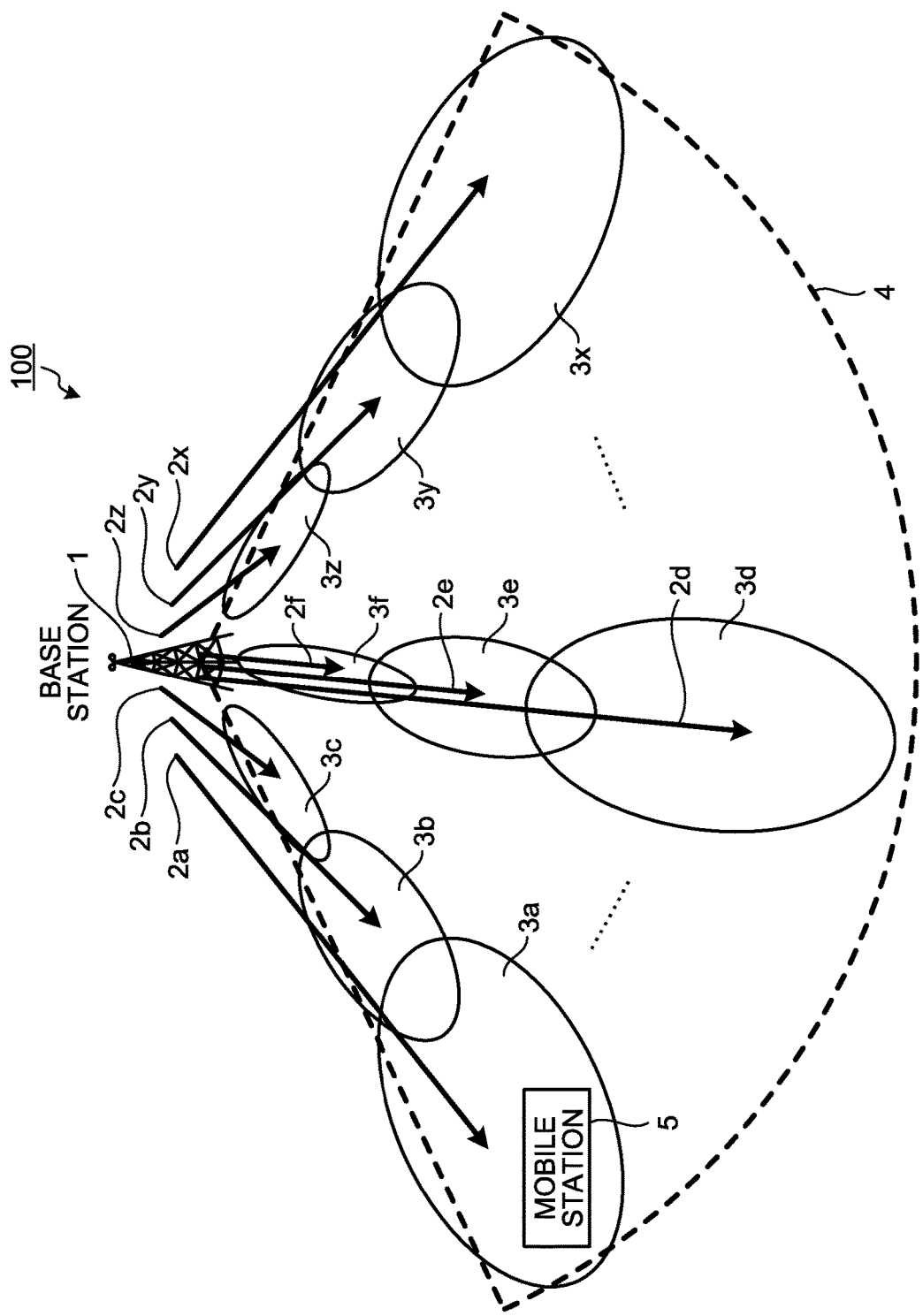
FIG. 1 is a diagram illustrating the configuration of a mobile communication system according to a first embodiment of the present invention.

FIG. 1 is a diagram illustrating the configuration of a mobile communication system according to a first embodiment of the present invention. A mobile communication system 100 includes a base station 1 and a mobile station 5. The mobile communication system 100 is a wireless communication system compliant with the communication standards in mobile communication. The base station 1 is capable of wireless communication with the mobile station 5, as well as with other base stations, the host device, and the like that are not illustrated in the drawing, and relays data transmitted from the mobile station 5 to other devices. The mobile station 5 is a portable telephone device or a tablet terminal, and is a portable information processing terminal that can be moved by a user who is carrying the terminal. Although one mobile station 5 is illustrated in FIG. 1, the present invention is not limited to this example, and the base station 1 can communicate with a plurality of mobile stations 5. The number of mobile stations 5 constituting the mobile communication system 100 may vary.

The base station 1 can form directional beams 2a through 2z, using a directional antenna. The directional beams 2a through 2z are directed in different directions from one another, and the base station 1 transmits and receives signals with the mobile station 5, using the formed directional beams 2a through 2z. Hereinafter, a signal transmitted from the base station 1 to the mobile station 5 will be referred to as a downlink signal, and a signal transmitted from the mobile station 5 to the base station 1 will be referred to as an uplink signal. Further, in a case where there is no need to particularly distinguish the directional beams 2a through 2z from one another, the directional beams 2a through 2z will be referred to as the directional beams 2. The ranges that downlink signals transmitted with the respective directional beams 2a through 2z reach will be referred to as the spots 3a through 3z. A cell 4 that is the communication area of the base station 1 is formed with the spots 3a through 3z, and the directions of the directional beams 2a through 2z are determined so that the spots 3a through 3z cover the entire range of the cell 4. The base station 1 switches the directions of the directional beams 2 formed in accordance with the position of the mobile station 5 with which the base station 1 communicates. For example, in the example illustrated in FIG. 1, the mobile station 5 can appropriately receive a downlink signal transmitted with the directional beam 2a, but can hardly receive a downlink signal transmitted with the directional beam 2x. Therefore, when communicating with the mobile station 5, the base station 1 forms the directional beam 2a. In FIG. 1, for the sake of simplicity, some of the directional beams 2a through 2z are not illustrated, and the directional beams 2a, 2b, 2c, 2d, 2e, 2f, 2x, 2y, and 2z are illustrated. Likewise, some of the spots 3a through 3z are not illustrated, and the spots 3a, 3b, 3c, 3d, 3e, 3f, 3x, 3y, and 3z are illustrated.

When the base station 1 cannot identify the position of the mobile station 5 when transmitting a signal to the mobile station 5, the base station 1 transmits a plurality of signals in a plurality of directions while switching the directions of the directional beams 2. When the base station 1 cannot identify the position of the mobile station 5 when receiving a signal from the mobile station 5, the base station 1 receives the signal by directing the directional beams 2 in a plurality of directions while switching the directions of the directional beams 2. The method of exchanging signals with the mobile station 5 while switching the directions of the directional beams 2 as described above is called a beam sweep.

The base station 1 can form a plurality of directional beams 2 at the same time. The number of times the base station 1 switches the directions of the directional beams 2 when performing a beam sweep is determined by: the number of directional beams, which is the number of the directional beams 2 that can be formed at the same time; and the number of spots, which is the number of the spots constituting the cell 4. For example, in a case where the base station 1 can simultaneously form three directional beams 2, and the cell 4 is formed with fifteen spots 3, the number of times switching is performed is five. The base station 1 forms directional beams 2 in three directions at one time, and switches the directions of the directional beams 2 at five separate occasions. By doing so, the base station 1 can communicate with the mobile station 5, no matter where the mobile station 5 exists in the cell 4.

In a case where the mobile station 5 does not communicate with the base station 1 for a predetermined period or longer, the mobile station 5 performs DRX control to conduct intermittent reception while remaining connected to the base station 1. The mobile station 5 performing DRX control performs a receiving operation in a predetermined reception period. When not in a reception period, however, the mobile station 5 does not perform any receiving operation, and does not perform any signal transmitting or receiving operation, either. Therefore, to communicate with the mobile station 5 performing DRX control, the base station 1 needs to transmit signals during a reception period of the mobile station 5. Specifically, the base station 1 transmits a signal at such timing that the transmitted signal will reach the mobile station 5 during a reception period. In a case where the mobile station 5 performing DRX control moves, the base station 1 might become unable to identify the position of the mobile station 5 in some cases. In this case, the base station 1 perform a synchronization process for matching a communication timing of the base station 1 with a communication timing of the mobile station 5, like random access, and establishes synchronization with the mobile station 5. In the present embodiment, in a case where the mobile station 5 performing DRX control moves, a non-contention synchronization process is performed. The operation in a non-contention synchronization process will be described later in detail.

In the case described below, the formation of the directional beam 2 at a time of downlink signal transmission and the formation of the directional beam 2 at a time of uplink signal reception are performed at different timings, and the base station 1 and the mobile station 5 perform communication compliant with Time Division Duplex (TDD). However, the technology of the present invention can also be applied in a case where the base station 1 and the mobile station 5 perform communication compliant with Frequency Division Duplex (FDD).

Figure 2:
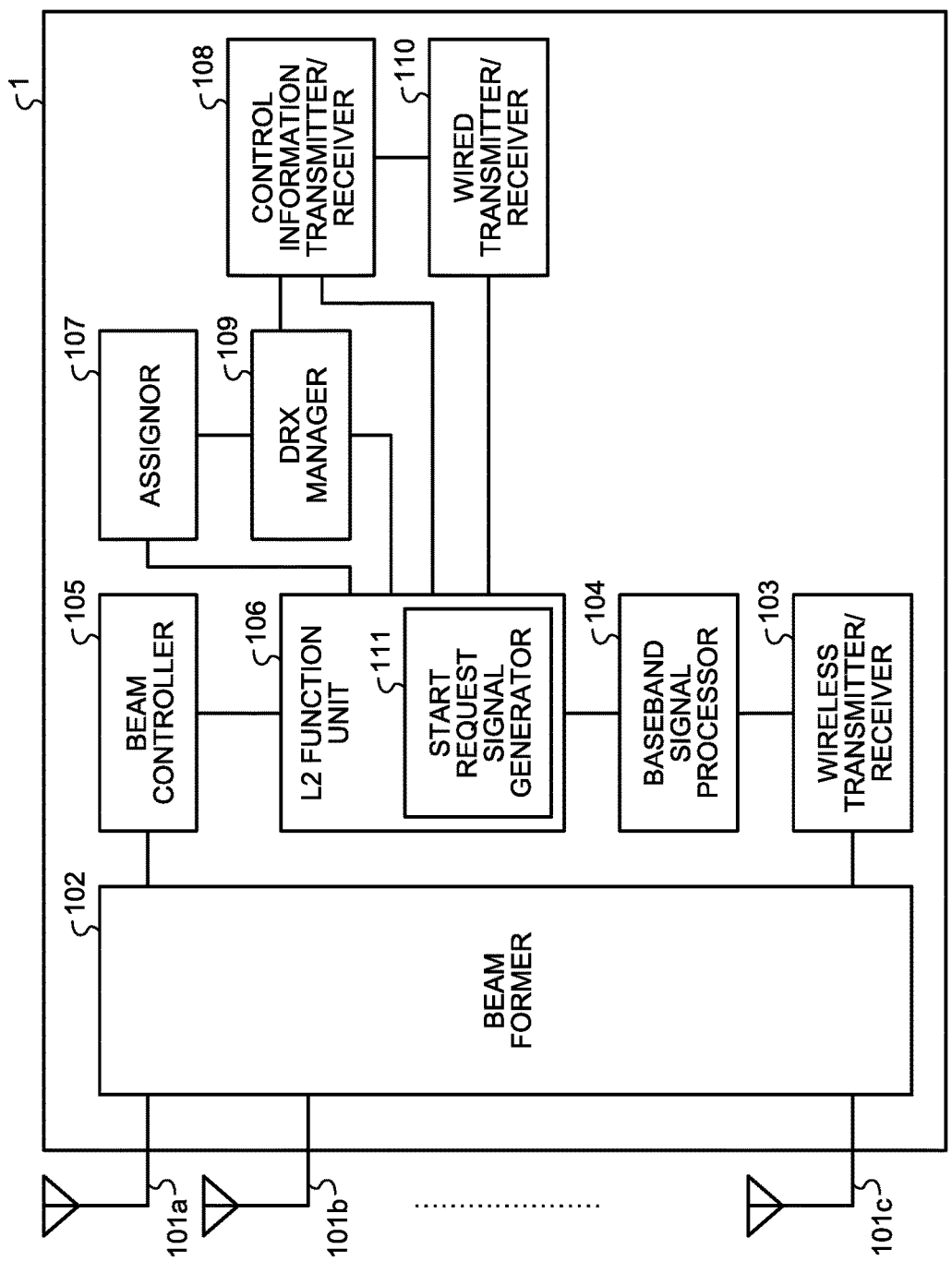
FIG. 2 is a diagram illustrating the functional configuration of the base station illustrated in FIG. 1.

FIG. 2 is a diagram illustrating the functional configuration of the base station 1 illustrated in FIG. 1. The base station 1 includes: a plurality of antennas 101a, 101b, and 101c; a beam former 102; a wireless transmitter/receiver 103; a baseband signal processor 104; a beam controller 105; an L2 function unit 106; an assignor 107; a control information transmitter/receiver 108; a DRX manager 109; and a wired transmitter/receiver 110.

The antennas 101a, 101b, and 101c are directional antennas for communicating with the mobile station 5. Under the control of the beam controller 105, the beam former 102 weights the amplitudes and the phases of radio waves emitted from the respective antennas 101a, 101b, and 101c, to adjust the amplitudes and the phases. By doing so, the beam former 102 can control the directions of the directional beams 2, and uses the directional beams 2 to receive signals transmitted from the mobile station 5 or transmit signals input from the wireless transmitter/receiver 103 to the mobile station 5. Using the plurality of antennas 101a, 101b, and 101c that differ for the respective directions of the directional beams 2, the beam former 102 can simultaneously form directional beams 2 in different directions.

The wireless transmitter/receiver 103 performs a process of transmitting a signal to the mobile station 5, and a process of receiving a signal transmitted from the mobile station 5. When a signal transmitted from the mobile station 5 is input, the wireless transmitter/receiver 103 performs a reception process, and inputs the signal into the baseband signal processor 104. The wireless transmitter/receiver 103 transfers a signal input from the baseband signal processor 104 to the beam former 102, and causes the beam former 102 to transmit the signal through the antenna 101a, 101b, and 101c. The baseband signal processor 104 performs a modulation process on a signal to be transmitted to the mobile station 5, and a demodulation process on a signal received from the mobile station 5.

For each transmission or reception timing, the beam controller 105 selects the direction of a directional beam 2 and the antenna 101a, 101b, and 101c to be used for each direction, and causes the beam former 102 to form a directional beam 2 in the selected direction with the selected antenna. In a case where a beam sweep is performed, the beam controller 105 manages the timing and direction for switching the directions of directional beams 2. The beam controller 105 identifies the direction of each mobile station 5 on the basis of the direction of the directional beam 2 and the reception quality at the time of reception of a signal from the mobile station 5, and manages the directions of directional beams 2 for transmitting and receiving signals to and from the respective mobile stations 5.

The L2 function unit 106 performs protocol processing for communicating with the mobile station 5, such as medium access control (MAC), radio link control (RLC), and packet data convergence protocol (PDCP), and converts the format of the data to be transmitted. The L2 function unit 106 also controls a synchronization process. The L2 function unit 106 includes a start request signal generator 111. In a case where a non-contention synchronization process is performed, the start request signal generator 111 generates a start request signal for requesting the mobile station 5 to start a synchronization process, and causes the beam former 102 to transmit the start request signal. When a synchronization process request start request signal is transmitted via the L2 function unit 106, the assignor 107 assigns a preamble for performing the non-contention synchronization process. In a case where the synchronization process is random access, the preamble is called a random access preamble. The start request signal generator 111 generates a start request signal containing preamble information indicating the preamble assigned to the mobile station 5 by the assignor 107.

The control information transmitter/receiver 108 transmits and receives a control message at the time of initial connection to the mobile station 5, determines the reception timing of a plurality of preambles and the parameters for the mobile station 5 to perform DRX control, and notifies the mobile station 5 of the reception timing and the parameters. In accordance with the information and the like that the control information transmitter/receiver 108 sent to the mobile station 5, the DRX manager 109 manages the parameters for each mobile station 5 to perform DRX control, and determines the timing at which the mobile station 5 can perform reception. The wired transmitter/receiver 110 is connected to the host device and other base stations 1 via wired communication paths, and communicates with the host device and other base stations 1.

Figure 3:
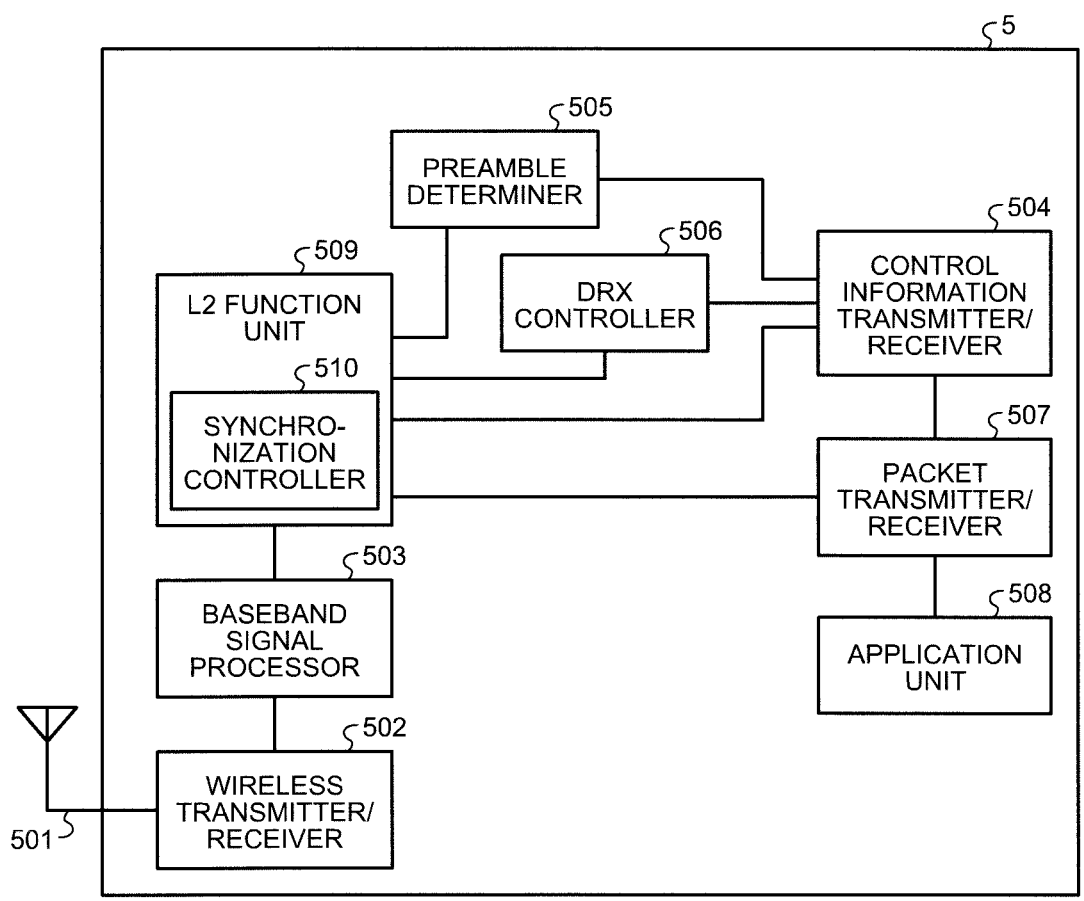
FIG. 3 is a diagram illustrating the functional configuration of the mobile station illustrated in FIG. 1.

FIG. 3 is a diagram illustrating the functional configuration of the mobile station 5 illustrated in FIG. 1. The mobile station 5 includes an antenna 501, a wireless transmitter/receiver 502, a baseband signal processor 503, a control information transmitter/receiver 504, a preamble determiner 505, a DRX controller 506, a packet transmitter/receiver 507, an application unit 508, and an L2 function unit 509. The L2 function unit 509 has the functions of a synchronization controller 510.

The wireless transmitter/receiver 502 performs wireless communication with the base station 1, using the antenna 501. Although the mobile station 5 has one antenna 501 in the example illustrated in FIG. 3, the mobile station 5 may have a plurality of antennas 501 and perform wireless communication by MIMO (Multiple Input Multiple Output). The baseband signal processor 503 performs a modulation process on a radio signal to be transmitted through the antenna 501 and a demodulation process on a received radio signal. The control information transmitter/receiver 504 transmits and receives control messages for initial connection to the base station 1, and receives from the base station 1 the information indicating the timing to transmit a preamble and the parameters for performing DRX control. The control information transmitter/receiver 504 inputs the received information indicating the timing to transmit a preamble into the L2 function unit 509, and inputs the received parameters for performing DRX control into the DRX controller 506.

The preamble determiner 505 determines the preamble to be used in performing a synchronization process with the base station 1. As the mobile station 5 performs a contention synchronization process when initial connection to the base station 1 is established, the preamble determiner 505 selects the preamble to be used from among a plurality of predetermined preambles. In a case where the mobile station 5 that is performing DRX control moves, and the base station 1 becomes unable to identify the position of the mobile station 5, a non-contention synchronization process is performed. Accordingly, an instruction to perform a non-contention synchronization process is issued from the base station 1, and a notification of the preamble is sent. In this case, the preamble determiner 505 stores the preamble sent from the base station 1.

The DRX controller 506 controls the transition of the DRX state and the receiving operation timing during the DRX control, in accordance with the parameters transferred from the base station 1. Specifically, when a state in which no communication with the base station 1 is performed lasts for a predetermined period, the DRX controller 506 performs DRX control. During the DRX control, the DRX controller 506 performs control so that the mobile station 5 performs a receiving operation only during a reception period that is a predetermined period, and does not perform signal transmission to the base station 1 and signal reception from the base station 1 in the other periods.

The packet transmitter/receiver 507 transmits and receives packets to and from the application unit 508 in the mobile station 5 and an external terminal device. The L2 function unit 509 performs protocol processing such as MAC, RLC, or PDCP, and format conversion on radio data. The L2 function unit 509 also has the functions of the synchronization controller 510 that controls the operation in a synchronization process. Upon receipt of the information indicating the timing to transmit a preamble from the control information transmitter/receiver 504, the L2 function unit 509 transmits a preamble in accordance with this information.

Figure 4:
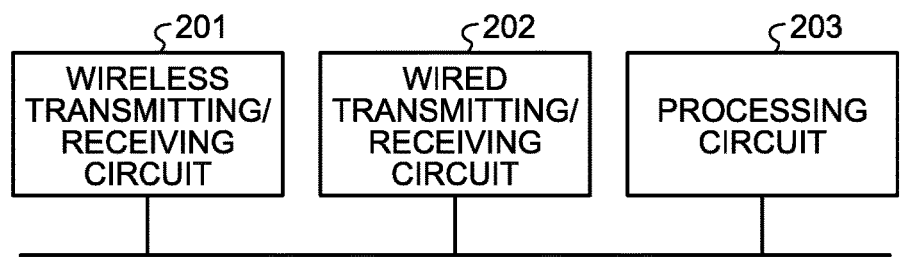
FIG. 4 is a diagram illustrating the hardware configuration forming the base station illustrated in FIG. 2.

FIG. 4 is a diagram illustrating the hardware configuration forming the base station 1 illustrated in FIG. 2. The respective functions of the base station 1 can be achieved with a wireless transmitting/receiving circuit 201, a wired transmitting/receiving circuit 202, and a processing circuit 203. The beam former 102 and the wireless transmitter/receiver 103 of the base station 1 can be realized with the wireless transmitting/receiving circuit 201. The wired transmitter/receiver 110 of the base station 1 can be realized with the wired transmitting/receiving circuit 202. The baseband signal processor 104, the beam controller 105, the L2 function unit 106, the assignor 107, the control information transmitter/receiver 108, and the DRX manager 109 can be realized with the processing circuit 203. In other words, the base station 1 includes the processing circuit 203 that determines the DRX state of the mobile station 5, transmits a start request signal requesting the start of a synchronization process during a reception period of the mobile station 5 through a beam sweep while changing the directions of directional beams 2, and performs a non-contention synchronization process with the mobile station 5.

The processing circuit 203 may be dedicated hardware. For example, the processing circuit 203 is a single circuit, a composite circuit, a programmed processor, a parallel-programmed processor, an application specific integrated circuit (ASIC), a field-programmable gate array (FPGA), or a combination thereof. Each of the functions of the baseband signal processor 104, the beam controller 105, the L2 function unit 106, the assignor 107, the control information transmitter/receiver 108, and the DRX manager 109 may be achieved with the processing circuit 203, or a plurality of functions may be collectively achieved with the processing circuit 203.

Figure 5:
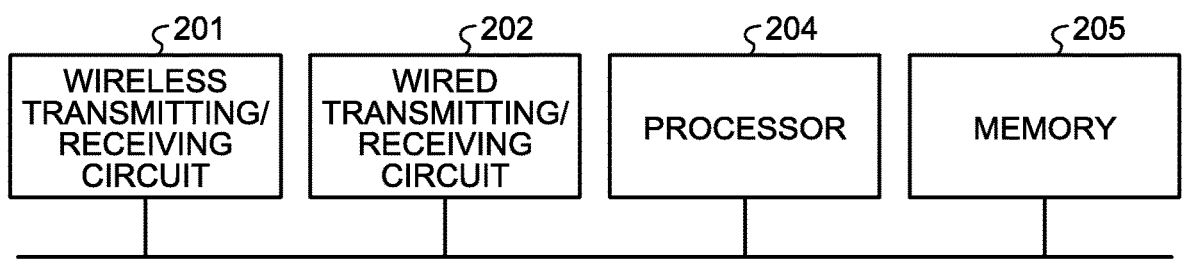
FIG. 5 is a diagram illustrating a hardware configuration in a case where the base station illustrated in FIG. 2 is formed with the use of a computer program.

FIG. 5 is a diagram illustrating a hardware configuration in a case where the base station 1 illustrated in FIG. 2 is formed with the use of a computer program. In a case where the base station 1 is realized with the use of a computer program, the processing circuit 203 in FIG. 4 is a processor 204 and a memory 205. The processor 204 is a central processor (CPU), and is also called a central processor, a processing device, an arithmetic device, a microprocessor, a microcomputer, a processor, a digital signal processor (DSP), or the like. The memory 205 is a nonvolatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disk, a compact disk, a mini disk, a digital versatile disk (DVD), or the like.

The baseband signal processor 104, the beam controller 105, the L2 function unit 106, the assignor 107, the control information transmitter/receiver 108, and the DRX manager 109 can be realized with the processor 204 executing the computer program stored in the memory 205.

Alternatively, some of the functions of the baseband signal processor 104, the beam controller 105, the L2 function unit 106, the assignor 107, the control information transmitter/receiver 108, and the DRX manager 109 may be achieved with dedicated hardware, and some of the functions may be achieved by the processor 204 executing the computer program stored in the memory 205.

As in the base station 1, the wireless transmitter/receiver 502 of the mobile station 5 can be realized with the wireless transmitting/receiving circuit 201, and the baseband signal processor 503, the control information transmitter/receiver 504, the preamble determiner 505, the DRX controller 506, the packet transmitter/receiver 507, the application unit 508, and the L2 function unit 509 can be realized with the dedicated processing circuit 203, the processor 204, and the memory 205, or a combination thereof.

Figure 6:
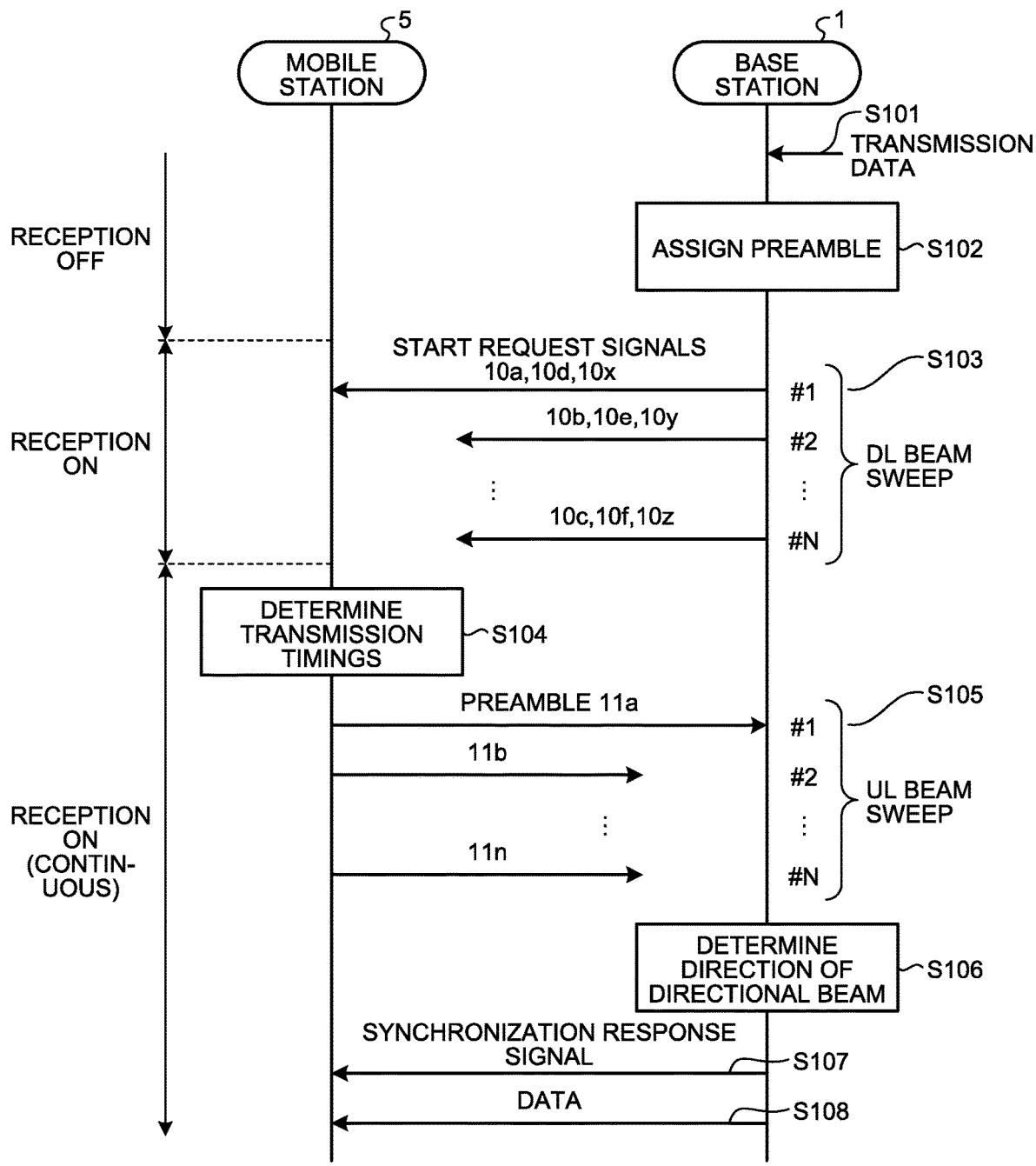
FIG. 6 is a chart illustrating operation of the mobile communication system according to the first embodiment of the present invention.

FIG. 6 is a chart illustrating operation of the mobile communication system according to the first embodiment of the present invention. In FIG. 6, in a state where the mobile station 5 is performing DRX control, downlink transmission data addressed to the mobile station 5 is generated, and the base station 1 and the mobile station 5 perform a non-contention synchronization process.

While the mobile station 5 is not performing a receiving operation in a period other than a reception period, transmission data addressed to the mobile station 5 is generated in the base station 1 (step S101). The assignor 107 of the base station 1 assigns a preamble to the mobile station 5 (step S102). The start request signal generator 111 generates start request signals 10*a* through 10*z* that include the assigned preamble and requests the start of a synchronization process. After waiting for the mobile station 5 to enter a reception period, the base station 1 transmits the generated start request signals 10*a* through 10*z* to the mobile station 5 while performing a beam sweep (step S103). In this example, the base station 1 can transmit three signals at the same time, and transmits three start request signals 10 in each of periods #1 through # N in which directional beams 2 are formed, in a downlink (hereinafter referred to as DL) beam sweep from the base station 1 to the mobile station 5. Specifically, in the period #1 in the DL beam sweep, the base station 1 simultaneously transmits the start request signals 10*a*, 10*d*, and 10*x* in the directions of the directional beams 2*a*, 2*d*, and 2*x* illustrated in FIG. 1. Likewise, in the period #2 in the DL beam sweep, the base station 1 simultaneously transmits the start request signals 10*b*, 10*e*, and 10*y* in the directions of the directional beams 2*b*, 2*e*, and 2*y*. In the period # N in the DL beam sweep, the base station 1 simultaneously transmits the start request signals 10*c*, 10*f*, and 10*z* in the directions of the directional beams 2*c*, 2*f*, and 2*z*.

In a case where the mobile station 5 moves from the current spot 3 while performing DRX control, and is located in the spot 3*a* at the time when the base station 1 transmits the synchronization process start request signals 10*a* through 10*x*, the mobile station 5 receives the start request signal 10*a* using the directional beam 2*a* with a high reception quality. The preamble determiner 505 of the mobile station 5 holds the preamble indicated by the preamble information contained in the received start request signal 10*a*. In an uplink (hereinafter referred to as UL) beam sweep as in conventional techniques, the mobile station 5 is informed, by the base station 1, of the period during which directional beams 2 are being formed, and know all the periods #1 through # N in the UL beam sweep. The synchronization controller 510 of the mobile station 5 determines a plurality of transmission timings, in accordance with the periods #1 through # N in the UL beam sweep (step S104). Specifically, the synchronization controller 510 determines a plurality of transmission timings so that transmitted preambles will arrive during the respective periods #1 through # N in the UL beam sweep of the base station 1.

While switching the directions of directional beams 2, the base station 1 performs a receiving operation during the plurality of periods #1 through # N in the UL beam sweep (step S105). The synchronization controller 510 transmits preambles 11*a* through 11*n* at the transmission timings synchronized with the respective periods #1 through # N in the UL beam sweep. In other words, in a case where the base station 1 receives preambles at a plurality of timings through an UL beam sweep, the mobile station 5 transmits preambles at a plurality of timings.

It should be noted that there is no dependency between the directions of the directional beams 2 during the periods #1 through # N in a DL beam sweep for transmitting the start request signals 10, and the directions of the directional beams 2 during the periods #1 through # N in an UL beam sweep for receiving the preambles. However, for the sake of simplicity, the directions of the directional beams 2 during the periods #1 through # N in the DL beam sweep are the same as the directions of the directional beams 2 during the periods #1 through # N in the UL beam sweep in this example. That is, in the period #1 in an UL beam sweep, the directional beams 2*a*, 2*d*, and 2*y* are simultaneously formed.

In the period #2 in the UL beam sweep, the directional beams 2*b*, 2*e*, and 2*y* are simultaneously formed. In the period # N in the UL beam sweep, the directional beams 2*c*, 2*f*, and 2*z* are simultaneously formed.

The base station 1 receives the preamble 11*a* with the highest quality among the preambles 11*a*, 11*b*, and 11*n* during the period #1 in the UL beam sweep. In accordance with the reception qualities of the preambles 11, the base station 1 determines the direction of the directional beam 2 when communicating with the mobile station 5 (step S106). Specifically, in a case where a plurality of preambles 11 is received, the L2 function unit 106 of the base station 1 selects the preamble 11 having the highest reception quality in terms of received signal strength, and determines the direction of the directional beam 2 at the time of the reception of this preamble 11 to be the direction of the directional beam 2 to be used in communicating with the mobile station 5. In this example, when the directional beam 2*a* is formed, the preamble 11*a* is received with the highest quality. The beam controller 105 of the base station 1 uses the directional beam 2*a* for the subsequent communication with the mobile station 5.

In response to the preamble 11, the L2 function unit 106 of the base station 1 transmits a synchronization response signal such as a random access response (RAR) to the mobile station 5 (step S107). At this stage, the beam controller 105 forms the directional beam 2*a* in the selected direction. As in conventional techniques, information for the mobile station 5 to adjust the transmission timing of an uplink signal is contained in the synchronization response signal. Accordingly, after receiving the synchronization response signal, the mobile station 5 adjusts the uplink signal transmission timing to complete the non-contention synchronization process. The base station 1 transmits generated transmission data addressed to the mobile station 5 in the direction of the same directional beam 2 as the synchronization response signal (step S108).

As described above, according to the first embodiment, even if the spot 3 in which the mobile station 5 is located changes as the mobile station 5 moves while performing DRX control, it is possible to perform a synchronization process using directional beams 2. At this stage, a non-contention synchronization process is performed with the preamble 11 assigned to the mobile station 5. Because of this, even if another mobile station 5 performs a synchronous process at the same time, no conflict occurs, and the synchronization process can be quickly completed. Thus, even in a case where the mobile station 5 moves during DRX control, it is possible to shorten the waiting time until the start of data transmission.

In a case where downlink signals addressed to a plurality of mobile stations 5 are generated in the base station 1, and the reception periods in the DRX control of these mobile stations 5 overlap, the base station 1 transmits start request signals 10 addressed to the respective mobile stations 5 by one DL beam sweep, and does not need to perform a DL beam sweep a plurality of times.

Second Embodiment

Figure 7:
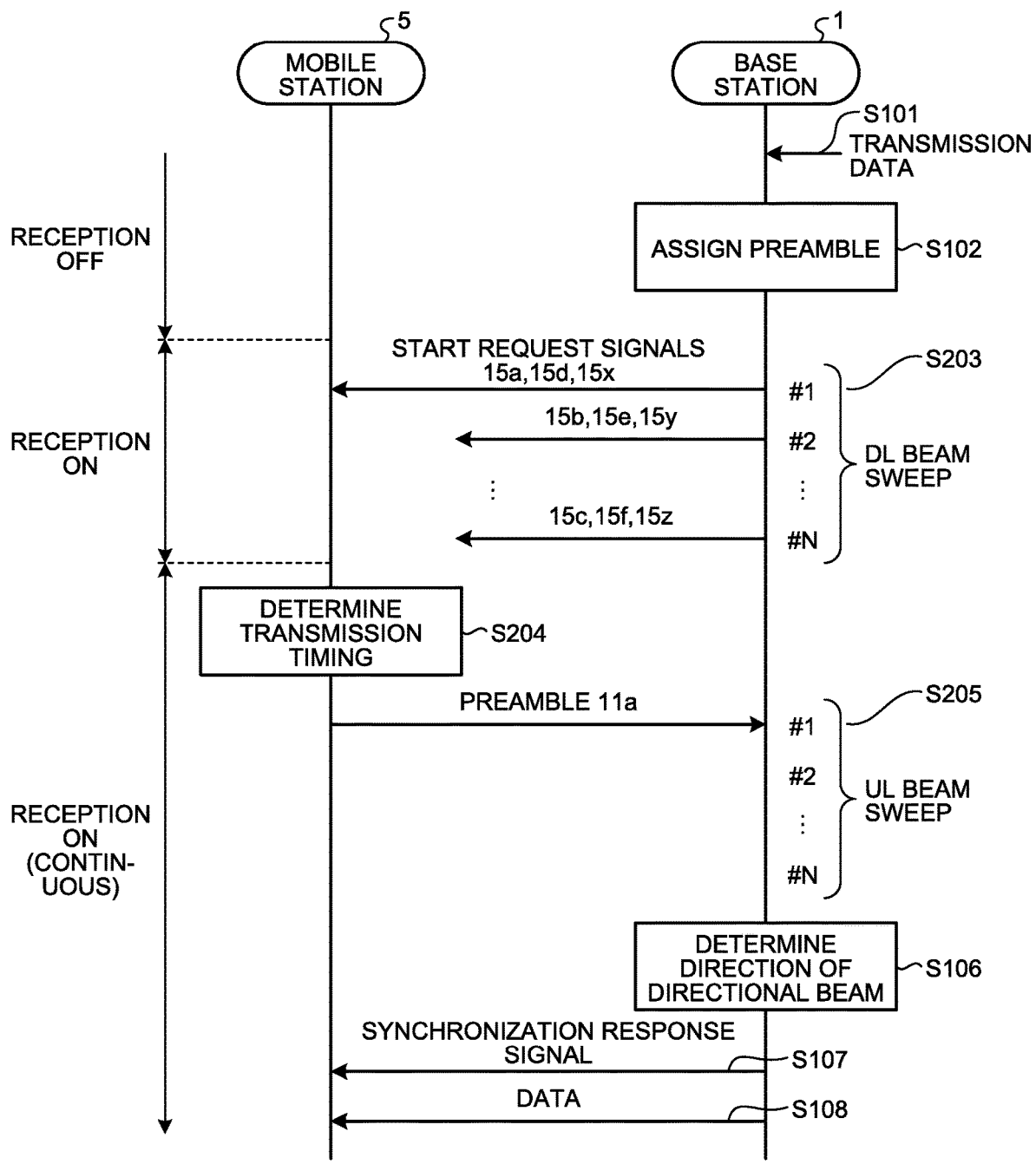
FIG. 7 is a chart illustrating operation of a mobile communication system according to a second embodiment of the present invention.

FIG. 7 is a chart illustrating operation of the mobile communication system according to a second embodiment of the present invention. The configuration of the mobile communication system 100, the configuration of the base station 1, and the configuration of the mobile station 5 according to the second embodiment are the same as the configurations of the first embodiment illustrated in FIGS. 1 through 3, and therefore, explanation thereof is not made herein. In the description below, the differences from the first embodiment will be mainly explained.

The operation in which transmission data is generated (step S101), and the assignor 107 assigns a preamble 11 to the mobile station 5 (step S102) is the same as that of the first embodiment. The start request signal generator 111 generates start request signals 15 containing timing information indicating the timing for the mobile station 5 to transmit a preamble 11 to the base station 1, as well as the preamble information indicating the assigned preamble 11. The start request signal generator 111 assigns the timing for the mobile station 5 to transmit the preamble 11 to each of the start request signals 15 in a plurality of directions.

Figures 8, 9:
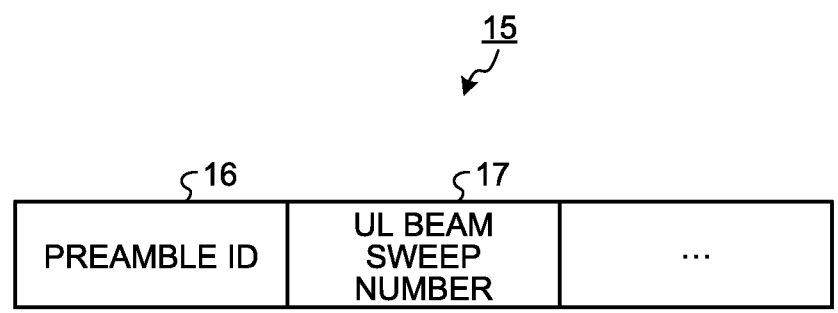
FIG. 8 is a diagram illustrating an example of a start request signal to be transmitted in step S203 in FIG. 7.
FIG. 9 is a diagram illustrating the directions of the directional beams during the beam sweeps illustrated in steps S203 and S205 in FIG. 7.

FIG. 8 is a diagram illustrating an example of a start request signal to be transmitted in step S203 in FIG. 7. A start request signal 15 includes a preamble identifier (ID) 16 and an UL beam sweep number 17. The preamble ID 16 is an example of the preamble information, and the UL beam sweep number 17 is an example of the timing information. The start request signal generator 111 sets the preamble ID 16 to a value common to start request signals 15a through 15z, and sets the UL beam sweep number 17 to a different value for each timing to transmit a start request signal 15. Specifically, the value of the UL beam sweep number 17 of each of the start request signals 15a, 15d, and 15x is "1", the value of the UL beam sweep number 17 of each of the start request signals 15b, 15e, and 15y is "2", and the value of the UL beam sweep number 17 of each of the start request signals 15c, 15f, and 15z is "N". In this case, the timing information is the UL beam sweep number indicating which UL beam sweep is the timing. However, the timing information is not limited to this example. The timing information may be radio frame time information, such as a radio frame number, a subframe number, a slot number, or a symbol number. As for the information indicating the mobile station 5 as the destination, the cyclic redundancy check (CRC) of the start request signal is scrambled with the identification information about the mobile station 5, so that the particular mobile station 5 can receive the information, as in the case of Long Term Evolution (LTE).

Referring back to FIG. 7, in a DL beam sweep, the base station 1 transmits the start request signals 15a through 15z in a plurality of directions (step S203). In a case where the mobile station 5 is located at the position illustrated in FIG. 1, the mobile station 5 receives, with the highest reception quality, the start request signal 15a transmitted with the directional beam 2a. When receiving a plurality of start request signals 15, the synchronization controller 510 of the mobile station 5 selects one start request signal 15 from among the received start request signals 15, in accordance with the reception qualities. The synchronization controller 510 then determines one transmission timing, in accordance with the timing information contained in the selected start request signal 15. Since the value "1" of the UL beam sweep number 17 is contained as the timing information in the start request signal 15a, the synchronization controller 510 determines one transmission timing so that the preamble will reach the base station 1 during the period #1 in the UL beam sweep (step S204).

The synchronization controller 510 transmits the preamble 11 sent through the start request signal 15, to the base station 1 at the determined transmission timing. The base station 1 notifies beforehand the mobile station 5 of the periods #1 through # N in the UL beam sweep. In the periods #1 through # N in the UL beam sweep, the base station 1 performs the beam sweep by switching the directions of directional beams 2 (step S205).

FIG. 9 is a diagram illustrating the directions of the directional beams during the beam sweeps illustrated in steps S203 and S205 in FIG. 7. In the UL beam sweep in step S205, the base station 1 forms the directional beam 2 in the same direction as the direction of the directional beam 2 in the period indicated by the same beam sweep number as in the DL beam sweep in step S203. As a result, the mobile station 5 is notified of the UL beam sweep number of the same value as the DL beam sweep number at the time when the start request signal 15 was transmitted. Thus, even when the mobile station 5 transmits the preamble 11 only during one period, the base station 1 can receive the preamble 11 without fail. In other words, the base station 1 notifies the mobile station 5 located in the direction in which the start request signal 15 was transmitted during the period #1 in the DL beam sweep, of the period #1 in the UL beam sweep. During the UL period #1, the directional beam 2 is formed in the same direction as the direction of the directional beam 2 formed during the period #1 in the DL beam sweep. In the first embodiment, the direction of a directional beam generated by the base station 1 during a period in an UL beam sweep is not known, and the mobile station 5 cannot determine the timing to transmit a preamble so that the base station 1 can receive the preamble. Therefore, the mobile station 5 transmit a preamble 11 in all the UL beam sweep periods. In the second embodiment, on the other hand, the mobile station 5 transmits only one preamble 11 in accordance with the timing information contained in the start request signal having the highest reception quality. Accordingly, the amount of communication between the base station 1 and the mobile station 5 can be reduced.

Referring back to FIG. 7, the operation from step S106 to step S108 is the same as that of the first embodiment, except that the base station 1 receives one preamble 11 from each one mobile station 5.

Third Embodiment

In the second embodiment described above, the base station 1 transmits the start request signal 15 to a specific mobile station 5. In a third embodiment, however, a non-contention synchronization process with a plurality of mobile stations 5 can be performed with one start request signal.

The configuration of the mobile communication system 100, the configuration of the base station 1, and the configuration of the mobile station 5 according to the third embodiment are the same as those in the first and second embodiments, and operations such as the direction of a directional beam 2 is the same as that of the second embodiment. Therefore, explanation of them is not repeated herein. In the description below, the structure of a start request signal, which is the difference from the second embodiment, will be mainly explained.

Figure 10:
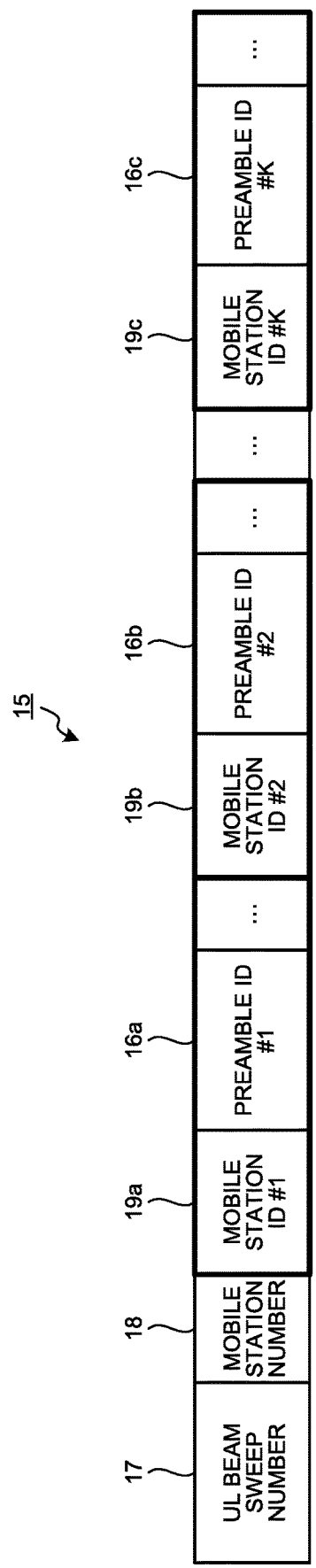
FIG. 10 is a diagram illustrating the structure of a start request signal to be transmitted from the base station according to a third embodiment to a mobile station.

FIG. 10 is a diagram illustrating the structure of a start request signal to be transmitted from the base station 1 to a mobile station according to the third embodiment. The start request signals 15a through 15z in FIG. 7 each contain a plurality of preamble IDs 16, an UL beam sweep number 17, the mobile station number 18, and a plurality of mobile station IDs 19 illustrated in FIG. 10. One UL beam sweep number 17 and one mobile station number 18 are contained in one start request signal 15, and one mobile station ID 19 and one preamble ID 16 are contained for each mobile station 5.

The mobile station number 18 is the number of mobile stations 5 requesting the start of a non-contention synchronization process with a start request signal 15, and is a value common to the start request signals 15a through 15z. The UL beam sweep number 17 is the same as the UL beam sweep number 17 in the second embodiment, and has different values for the respective start request signals 15a through 15z. Preamble IDs 16a through 16c are preamble information indicating the preamble 11 allocated to each mobile station 5, and mobile station IDs 19a through 19c are identification information for identifying the respective mobile stations 5. In the present embodiment, the CRCs of the start request signals 15 are scrambled with information common to all the mobile stations, so that all the mobile stations located in the communication area of the base station 1 can perform reception.

In a case where the start request signal generator 111 of the base station 1 starts a non-contention synchronization process with a plurality of mobile stations 5, the start request signal generator 111 generates the start request signal 15 illustrated in FIG. 10, and transmits the generated start request signal 15 by a beam sweep. The synchronization controller 510 of the mobile station 5 that has received the start request signal 15 checks whether the mobile station ID 19 of the mobile station 5 is contained in the received start request signal 15. If the mobile station ID 19 of the mobile station 5 is included, the synchronization controller 510 transmits the preamble 11 in accordance with the corresponding preamble ID 16 and UL beam sweep number 17. The operation of the base station 1 that has received the preamble 11 is the same as that of the second embodiment, and therefore, the explanation thereof is not repeated herein.

As described above, in the third embodiment, the base station 1 can request a plurality of mobile stations 5 to start a non-contention synchronization process with one start request signal 15. Accordingly, it is possible to reduce the number of start request signals 15 to be transmitted, and reduce the radio resources between the base station 1 and the mobile stations 5.

Fourth Embodiment

In the first through third embodiments described above, there is no relationship between the timing at which a beam sweep for the base station 1 to transmit a beam intrinsic signal for identifying a directional beam, and the timing at which a beam intrinsic signal for transmitting a start request signal for a non-contention synchronization process. In a fourth embodiment, both a beam sweep for transmitting a beam intrinsic signal and a beam sweep for transmitting a start request signal are performed in one reception period.

The configuration of the mobile communication system 100, the configuration of the base station 1, and the configuration of the mobile station 5 according to the fourth embodiment are the same as the configurations of the first embodiment illustrated in FIGS. 1 through 3, and therefore, explanation thereof is not made herein.

Figure 11:
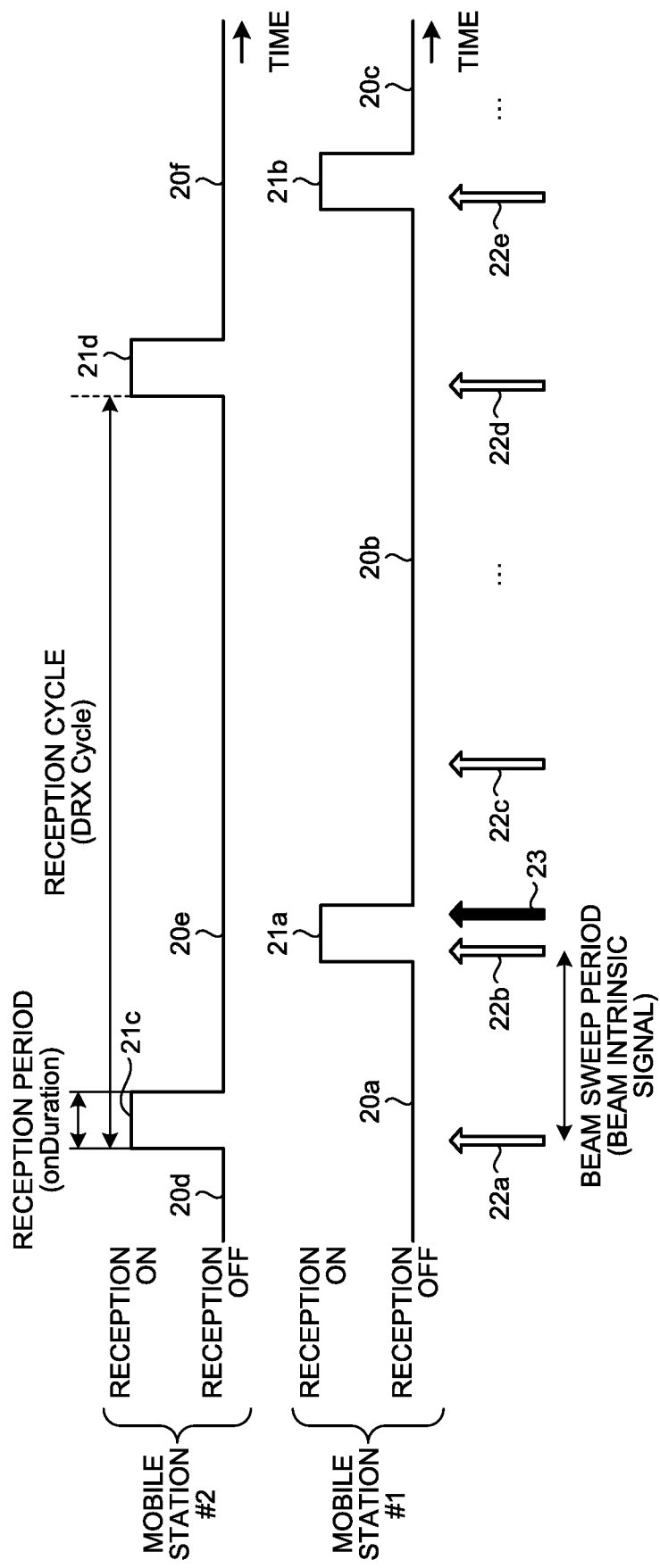
FIG. 11 is a diagram for explaining operation of a mobile communication system according to a fourth embodiment of the present invention.

FIG. 11 is a diagram for explaining operation of a mobile communication system according to the fourth embodiment of the present invention.

The control information transmitter/receiver 108 of the base station 1 determines the parameters to be used by a mobile station #1 and a mobile station #2 illustrated in FIG. 11 in performing DRX control, and notifies the mobile station #1 and the mobile station #2 of the parameters. The parameters to be used in DRX control are a reception period, reception cycle, a reception timing offset, and the like, and these parameters may vary with each mobile station 5. In this example, for ease of explanation, the length of a reception period and a reception cycle of the mobile station #2 are the same as the length of a reception period and a reception cycle of the mobile station #1, and the reception timing offset varies with each mobile station 5.

The mobile station #1 does not perform a receiving operation during non-reception periods 20a, 20b, and 20c, and performs a receiving operation during reception periods 21a and 21b. The mobile station #2 does not perform a receiving operation during non-reception periods 20d, 20e, and 20f, and performs a receiving operation during reception periods 21c and 21d.

The base station 1 performs beam sweeps 22a, 22b, 22c, 22d, and 22e for transmitting beam intrinsic signals, and a beam sweep 23 for transmitting a synchronization process start request signal. A beam intrinsic signal is a signal for identifying a directional beam 2 of the base station 1, and is repeatedly transmitted at regular intervals. A beam intrinsic signal may be included in a synchronization signal or an annunciation signal, or may be a reference signal (RS) different from any synchronization signal or annunciation signal. Hereinafter, these signals will be collectively referred to as beam intrinsic signals.

The control information transmitter/receiver 108 determines a reception offset so that the reception periods are synchronized with the timings to perform the beam sweeps 22 for transmitting beam intrinsic signals, with the reception cycles of the mobile station #1 and the mobile station #2 being integral multiples of a beam sweep period for transmitting a beam intrinsic signal. For example, in a case where a beam sweep 22 for transmitting a beam intrinsic signal is cyclically and repeatedly performed from the time when the radio frame number is "0", the time when the reception offset is added to the radio frame number "0" is the start point of a reception period. Accordingly, the control information transmitter/receiver 108 can set the reception offset to an integral multiple of a cycle in which a beam sweep 22 is performed, so that the start time of a reception period is synchronized with the start time of a beam sweep 22. With this arrangement, it is possible to cause the mobile station #1 and the mobile station #2 performing DRX control to perform receiving operations, in synchronization with the periods during which beam sweeps 22 for transmitting beam intrinsic signals are performed. The control information transmitter/receiver 108 also determines the lengths of reception periods 21 of the mobile station #1 and the mobile station #2 so that the lengths of the reception periods 21 become longer than the sum of the time required for a beam sweep 22 for transmitting a beam intrinsic signal and the time required for a beam sweep 23 of a synchronization process start request signal. With this arrangement, the mobile station #1 and the mobile station #2 can receive a beam intrinsic signal and a synchronization process start request signal in one reception period 21.

After determining the timing of a beam sweep 22 for transmitting a beam intrinsic signal, the control information transmitter/receiver 108 notifies the beam controller 105 and the mobile station 5 of the determined timing of a beam sweep 22 via the L2 function unit 106. The beam controller 105 designates a beam intrinsic signal for the baseband signal processor 104 via the L2 function unit 106 at the notified timing. As a result, the beam intrinsic signal is transmitted by a beam sweep 22 at the timing determined by the control information transmitter/receiver 108.

As described above, in the mobile communication system 100 according to the fourth embodiment, the control information transmitter/receiver unit 108 of the base station 1 determines the parameters to be used by the mobile station #1 and the mobile station #2 to perform DRX control, and issues a notification of the parameters. In doing so, the control information transmitter/receiver 108 adjusts the timings of the reception periods to the timings of the beam sweeps 22 for transmitting beam intrinsic signals, with the reception cycles of the mobile station #1 and the mobile station #2 being integral multiples of a beam sweep period for transmitting a beam intrinsic signal. With this arrangement, the mobile station #1 and the mobile station #2 performing DRX control can receive a beam intrinsic signal during each reception period, and determine whether the mobile station #1 and the mobile station #2 are located within the communication area of the base station 1 during each reception period. Thus, the mobile station #1 and the mobile station #2 become capable of determining in an early stage whether to connect to another base station 1.

Although the operation of cyclically transmitting a beam intrinsic signal by a beam sweep 22 has not been described in the above first through third embodiments, the same operation as that of the fourth embodiment is performed in the first through third embodiments.

Fifth Embodiment

In the above first through fourth embodiments, the base station 1 performs a beam sweep for transmitting a beam intrinsic signal and a beam sweep for transmitting a synchronization process start request signal as different beam sweeps. In a fifth embodiment, however, a beam intrinsic signal and a synchronization request start request signal are transmitted by one beam sweep.

Figure 12:
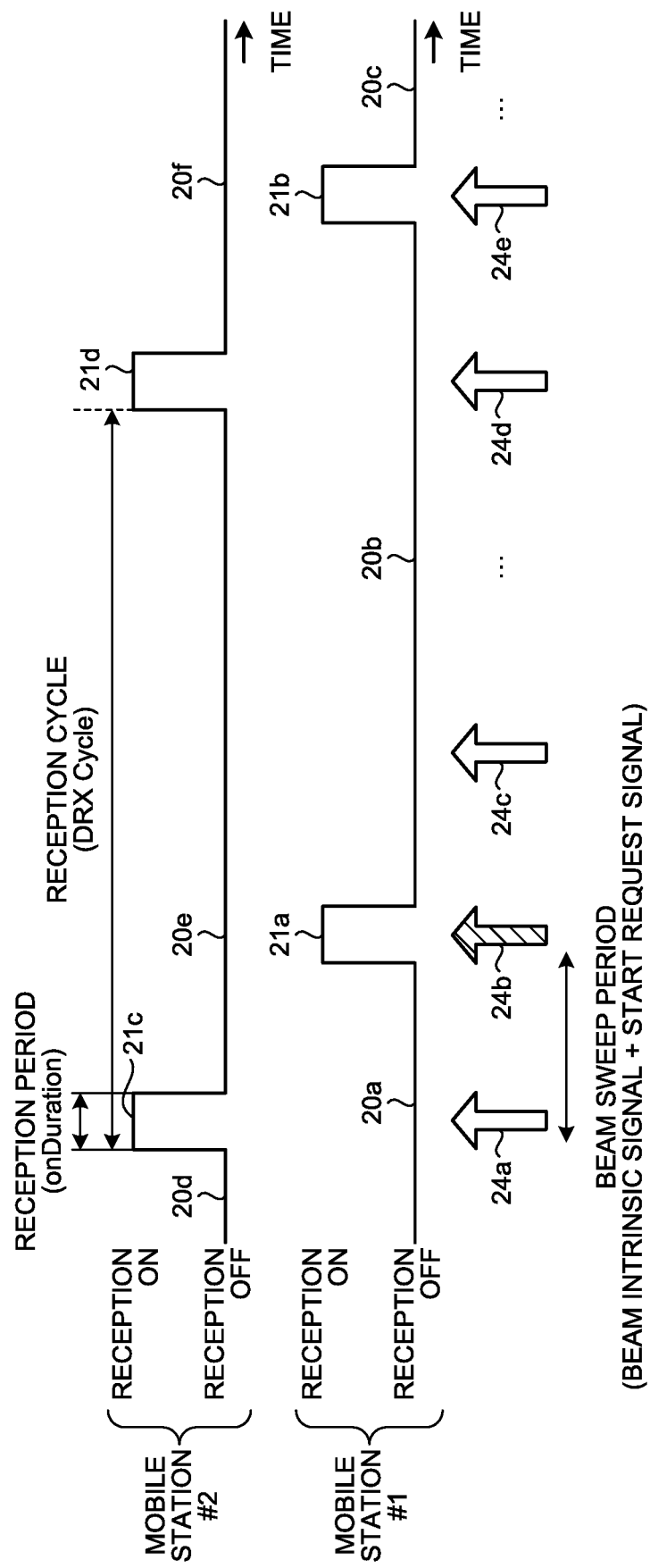
FIG. 12 is a diagram for explaining operation of a mobile communication system according to a fifth embodiment of the present invention.

FIG. 12 is a diagram for explaining operation of a mobile communication system according to the fifth embodiment of the present invention. The configuration of the mobile communication system 100, the configuration of the base station 1, and the configuration of the mobile station 5 according to the fifth embodiment are the same as the configurations of the first embodiment illustrated in FIGS. 1 through 3, and therefore, explanation thereof is not made herein. In the description below, the differences from the fourth embodiment will be mainly explained.

The method by which the control information transmitter/receiver 108 of the base station 1 determines reception periods 21, reception cycles, and the reception offset is the same as that of the fourth embodiment. With this arrangement, in a case where the base station 1 transmits a synchronization process start request signal to the mobile station #1, the base station 1 transmits both a beam intrinsic signal and a start request signal in one reception period 21a. In the present embodiment, a beam intrinsic signal and a start request signal are multiplexed, and are transmitted by one beam sweep 24.

Figure 13:
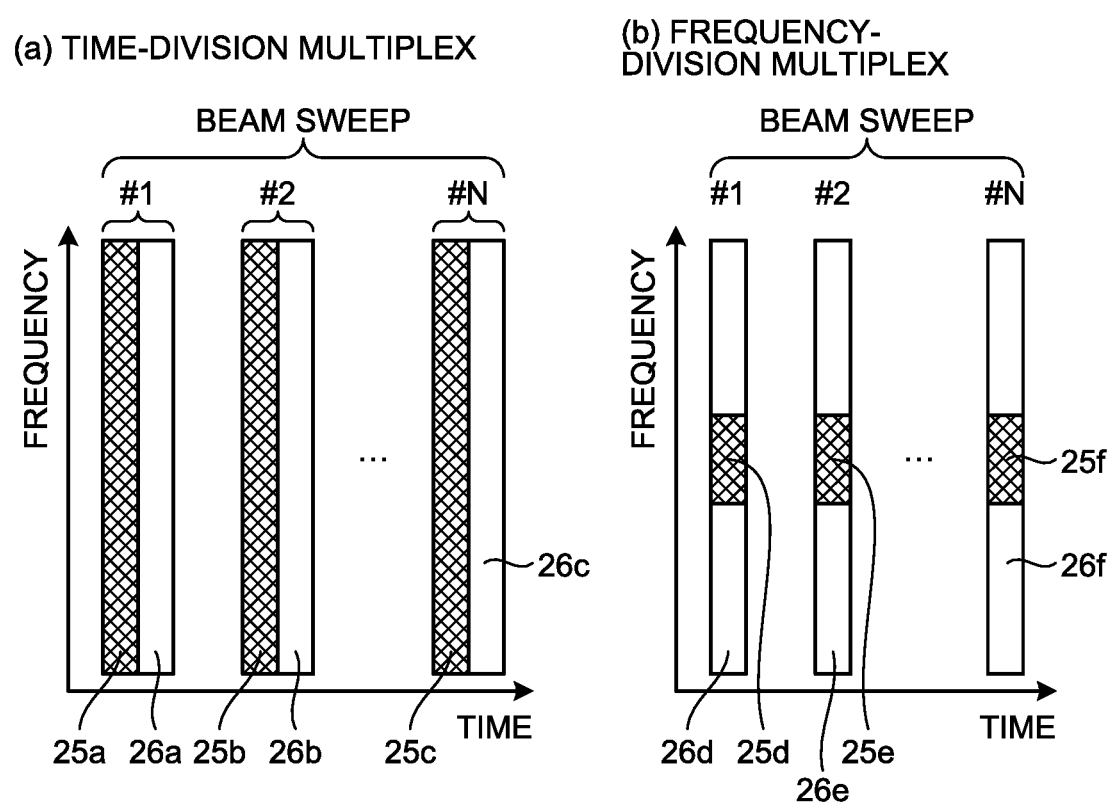
FIG. 13 is a diagram illustrating examples of multiplexed transmission signals to be transmitted from a base station according to the fifth embodiment.

FIG. 13(a) and FIG. 13(b) are diagrams illustrating examples of multiplexed transmission signals to be transmitted from the base station 1 according to the fifth embodiment. Here, directional beams 2 are transmitted in N directions by one beam sweep 24. In FIG. 13, the abscissa axis indicates time, and the ordinate axis indicates frequency. FIG. 13(a) illustrates an example of transmission of beam intrinsic signals 25 and start request signals 26 by time-division multiplex. During one beam sweep, the base station 1 performs signal transmission N times. In one signal transmitting operation, the base station 1 performs time-division multiplexing on beam intrinsic signals 25a, 25b, and 25c, and start request signals 26a, 26b, and 26c, and transmits the signals. For example, in signal transmission #1, the base station 1 performs time-division multiplexing on the beam intrinsic signal 25a and the start request signal 26a, and transmits these signals.

FIG. 13(b) illustrates an example of transmission of beam intrinsic signals 25 and start request signals 26 by frequency-division multiplex. During one beam sweep, the base station 1 performs signal transmission N times. In one signal transmitting, the base station 1 performs frequency-division multiplexing on beam intrinsic signals 25d, 25e, and 25f, and start request signals 26d, 26e, and 26f, and transmits these signals.

In a case where there is no need to transmit any start request signal, the radio resource areas of the start request signals 26a, 26b, 26c, 26d, 26e, and 26f may be set as free areas, or may be used for other signal transmission.

Figure 14:
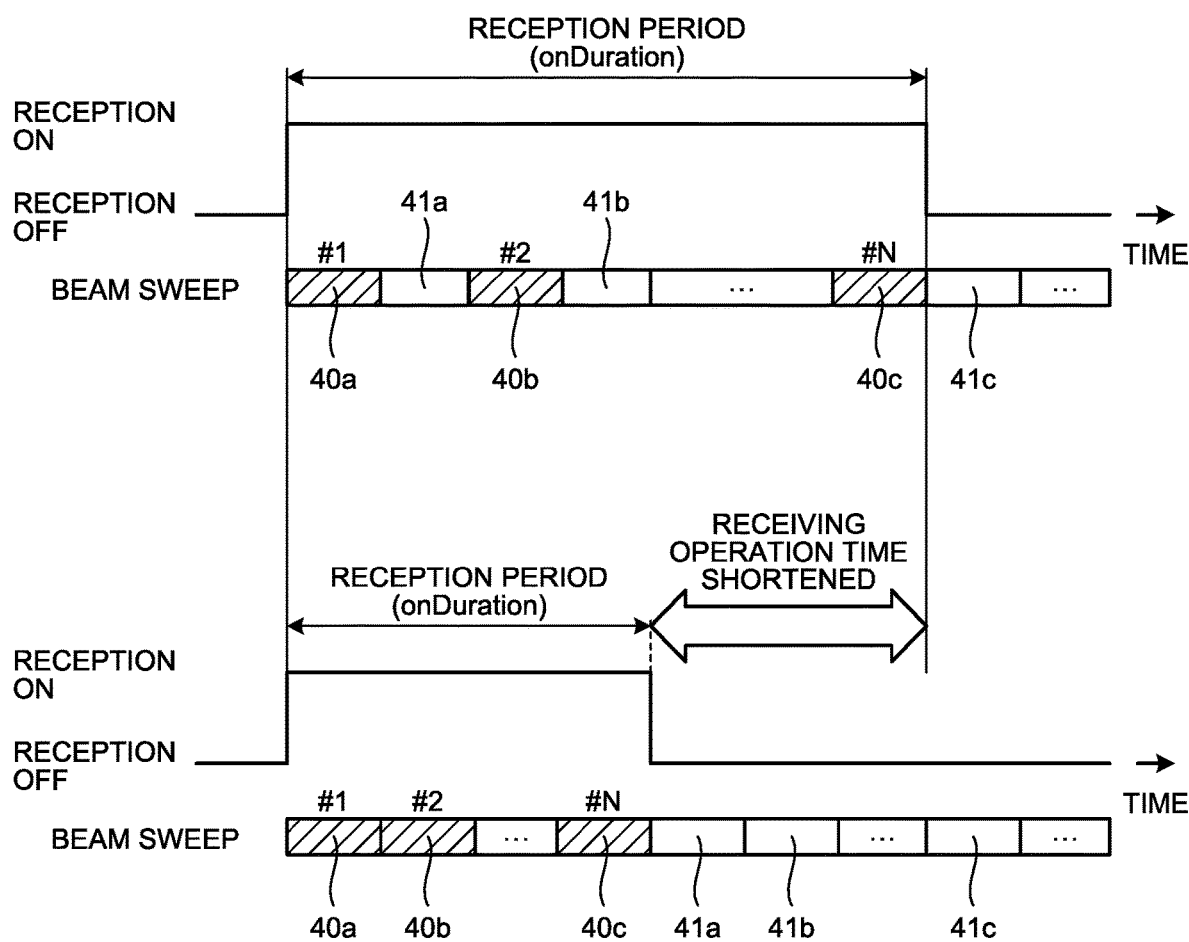
FIG. 14 is a diagram for explaining a method for further shortening reception periods in the operation illustrated in FIG. 12.

FIG. 14 is a diagram for explaining a method for further shortening the reception periods in the operation illustrated in FIG. 12. The base station 1 can also transmit a signal to the mobile station 5 at another destination while performing a beam sweep. The upper half of FIG. 14 illustrates an example in which signal transmissions 40a through 40c by a beam sweep and signal transmissions 41a through 41c to another destination are alternately performed. However, communication with the mobile station 5 performing DRX control can be performed only during the reception periods. Therefore, in a case where the base station 1 is performing a non-contention synchronization process with the mobile station 5 performing DRX control, the base station 1 collectively and continuously performs the signal transmissions 40a through 40c by a beam sweep. Thus, the reception periods can be further shortened.

As described above, as start request signals 26 multiplexed with beam intrinsic signals 25 are transmitted, so that the beam intrinsic signals 25 and the start request signals 26 can be transmitted by one beam sweep. Accordingly, the number of times a beam sweep is performed can be reduced, the switching time accompanying the beam switching can be shortened, and the total time required for transmitting the beam intrinsic signals 25 and the start request signals 26 can be shortened. In the examples described above, the beam intrinsic signals 25 and the start request signals 26 are subjected to time-division multiplexing, or the beam intrinsic signals 25 and the start request signals 26 are subjected to frequency-division multiplexing. In the case of frequency-division multiplex, the reduction in time becomes greater than in the case of time-division multiplex. In the fifth embodiment, the reception periods are set so as to be longer than the total time required for transmitting the beam intrinsic signals 25 and the start request signals 26, as in the fourth embodiment. As the total time required for transmitting the beam intrinsic signals 25 and the start request signals 26 can be shortened, the reception periods can also be shortened. Furthermore, as the base station 1 collectively and continuously performs the signal transmissions 40a through 40c by a beam sweep, the reception periods of the mobile station 5 can be further shortened. As the reception periods are shortened, power consumption of the mobile station 5 can be reduced.

It should be noted that the timings to receive the preamble 11 by a beam sweep are associated with the timings to transmit beam intrinsic signals. As a result, it becomes unnecessary to add beam sweep numbers to the start request signals as illustrated in FIGS. 8 and 10. Thus, it becomes possible to reduce the radio resources required for transmitting the start request signals.

The configuration described in the above embodiments shows an example of the contents of the present invention. The configuration can be combined with another known technology, or part of the configuration may be omitted or modified without departing from the scope of the present invention.

REFERENCE SINGS LIST

1 base station; 2, 2a, 2b, 2c, 2d, 2e, 2f, 2x, 2y, 2z directional beam; 3, 3a, 3b, 3c, 3d, 3e, 3f, 3x, 3y, 3z spot; 4 cell; 5 mobile station; 10, 10a, 10b, 10c, 10d, 10e, 10f, 10x, 10y, 10z, 15, 15a, 15b, 15c, 15d, 15e, 15f, 15x, 15y, 15z, 26, 26a, 26b, 26c, 26d, 26e, 26f start request signal; 11, 11a, 11b, 11n preamble; 16, 16a, 16b, 16c preamble ID; 17 UL beam sweep number; 18 number of mobile stations; 19, 19a, 19b, 19c mobile station ID; 20a, 20b, 20c, 20d, 20e, 20f non-reception period; 21a, 21b, 21c, 21d reception period; 22a, 22b, 22c, 22d, 22e, 23 beam sweep; 25a, 25b, 25c, 25d, 25e, 25f beam intrinsic signal; 101, 101a, 101b, 101c antenna; 102 beam former; 103 wireless transmitter/receiver; 104 baseband signal processor; 105 beam controller; 106 L2 function unit; 107 assignor; 108 control information transmitter/receiver; 109 DRX manager; 110 wired transmitter/receiver; 111 start request signal generator; 201 wireless transmitting/receiving circuit; 202 wired transmitting/receiving circuit; 203 processing circuit; 204 processor; 205 memory; 501 antenna; 502 wireless transmitter/receiver; 503 baseband signal processor; 504 control information transmitter/receiver; 505 preamble determiner; 506 DRX controller; 507 packet transmitter/receiver; 508 application unit; 509 L2 function unit; 510 synchronization controller.

The invention claimed is:

1. A base station that communicates with a mobile station that intermittently performs a receiving operation during a cyclic reception period, the base station comprising:

an assignor to assign a preamble to the mobile station;

a start request signal generator to generate a start request signal containing the preamble assigned to the mobile station and requesting a start of a synchronization process between the mobile station and the base station; and a beam controller to transmit the start request signal in a plurality of directions while switching directions of a directional beam within the cyclic reception period, and determine a direction of the directional beam for communicating with the mobile station, in accordance with the direction of the directional beam at the time of reception of the preamble transmitted from the mobile station having received the start request signal.

2. The base station according to claim 1, wherein the start request signal generator assigns timings for the mobile station having received the start request signal to transmit the preamble to the respective start request signals in the plurality of directions, and generates the start request signal containing timing information indicating the assigned timings, and the beam controller adjusts the direction of the directional beam to the direction of the directional beam at the time of transmission of the respective start request signal containing the timing information at the plurality of timings indicated by the plurality of pieces of the timing information.

3. The base station according to claim 2, wherein the assignor assigns a different preamble to each of a plurality of mobile stations, and the start request signal generator generates the start request signal containing a plurality of the preambles assigned to the plurality of mobile stations.

4. The base station according to claim 1, wherein the beam controller cyclically repeats a beam sweep for transmitting beam intrinsic signals specific to the respective directional beams in the plurality of directions while switching directions of the directional beams, and the base station further comprises a control information transmitter/receiver to notify the mobile station of a reception cycle as a cycle of the intermittent receiving operation, with the reception cycle being an integral multiple of a cycle of the beam sweep for transmitting the beam intrinsic signals.

5. The base station according to claim 4, wherein the control information transmitter/receiver notifies the mobile station of the reception period determined by setting a length of the reception period as a period equal to or longer than a sum of a time required for the beam sweep for transmitting the beam intrinsic signals and a time required for a beam sweep for transmitting the start request signal.

6. The base station according to claim 1, wherein the beam controller cyclically repeats a beam sweep for transmitting beam intrinsic signals specific to the respective directional beams in the plurality of directions while switching directions of the directional beams, and multiplexes the beam intrinsic signals with the start request signal when transmitting the start request signal.

7. The base station according to claim 1, wherein, when transmitting a plurality of start request signals in the plurality of directions while switching directions of the directional beams, the beam controller continuously transmits the plurality of the start request signals.

8. A mobile station that intermittently performs a receiving operation to receive a signal from a base station in a cyclic reception period, the mobile station comprising a synchronization controller to transmit a preamble to the base station at a plurality of timings, when receiving one of start request signals transmitted in a plurality of directions by the base station switching directions of directional beams, each of the start request signals containing a preamble assigned to the mobile station by the base station and requesting a start of a synchronization process between the mobile station and the base station.

9. The mobile station according to claim 8, wherein, when the start request signal contains timing information indicating a timing at which the mobile station transmits the preamble, the synchronization controller transmits the preamble in accordance with the timing information, the timing indicated by the timing information being a timing assigned to the start request signal by the base station.

10. The mobile station according to claim 8, wherein, when receiving the start request signal multiplexed with a beam intrinsic signal specific to each of the directional beams, the synchronization controller transmits the preamble contained in the start request signal, in accordance with reception timing information about the preamble of the base station corresponding to the beam intrinsic signal.

11. A communication method implemented by a mobile communication system including a mobile station that intermittently performs a receiving operation during a cyclic reception period, and a base station that communicates with the mobile station, the communication method comprising:
assigning a preamble to the mobile station by the base station;
transmitting, in a plurality of directions, a start request signal containing the assigned preamble and requesting a start of a synchronization process between the mobile station and the base station while switching directions of a directional beam within the cyclic reception period by the base station; and
performing, by the base station, a non-contention synchronization process using the preamble indicated by the received start request signal, when mobile station receives the start request signal.

12. A control circuitry to control a base station that communicates with a mobile station, the control circuitry comprising:
a wireless transmitting/receiving circuitry configured to realize a function of a beam former and a wireless transmitter/receiver of the base station, wherein
the beam former is configured to weight the amplitudes and phases of radio waves emitted from antennas, adjust the amplitudes and the phases, and simultaneously form directional beams in different directions, and
the wireless transmitter/receiver is configured to perform a process of transmitting a signal to the mobile station, and to perform a process of receiving a signal transmitted from the mobile station;
a wired transmitting/receiving circuitry configured to realize a function of the wired transmitter/receiver that is connected to a host device and other base stations via wired communication paths, and to communicate with the host device and the other base stations; and
a processing circuitry configured to determine (DRX) state of the mobile station, transmit a start request signal requesting a start of a synchronization process during a reception period of the mobile station through a beam sweep while changing the directions of directional beams, and perform a non-contention synchronization process with the mobile station.

13. A computer program product comprising a non-transitory computer usable medium having a computer readable program that causes:
a baseband signal processor to perform a modulation process on a signal to be transmitted to a mobile station, and a demodulation process on a signal received from the mobile station;
a beam controller to select a direction of a directional beam and an antenna to be used for each direction, and cause a beam former to form the directional beam in the selected direction with the selected antenna;
an L2 function circuitry to perform protocol processing for communicating with the mobile station;
an assignor to assign a preamble for performing a non-contention synchronization process;
a control information transmitter/receiver to transmit and receive a control message at a time of initial connection to the mobile station, determine a reception timing of a plurality of preambles and parameters for the mobile station to perform (DRX) control, and notify the mobile station of the reception timing and the plurality of parameters; and
a DRX manager to manage the plurality of parameters for each mobile station to perform the DRX control, and determines the timing at which the mobile station can perform reception.

* * * * *